United States Patent
Baba et al.

(10) Patent No.: US 8,072,165 B2
(45) Date of Patent: Dec. 6, 2011

(54) APPARATUS FOR ESTIMATING ROTOR POSITION OF BRUSHLESS MOTORS AND SYSTEM AND METHOD FOR CONTROLLING START-UP OF BRUSHLESS MOTORS

(75) Inventors: Hiroyasu Baba, Nishio (JP); Yuji Hayashi, Kasugai (JP); Kiyoshi Nagata, Nagoya (JP); Masaya Ootake, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 427 days.

(21) Appl. No.: 12/469,187

(22) Filed: May 20, 2009

(65) Prior Publication Data

US 2009/0289587 A1 Nov. 26, 2009

(30) Foreign Application Priority Data

May 22, 2008 (JP) ................................ 2008-134194

(51) Int. Cl.
*H03K 5/00* (2006.01)
*H02P 6/04* (2006.01)
(52) U.S. Cl. .............................. 318/400.13; 318/400.11
(58) Field of Classification Search ............ 310/400.01–400.04, 400.06, 400.1, 310/400.11, 400.13
See application file for complete search history.

(56) References Cited

U.S. PATENT DOCUMENTS

| 4,012,166 A | * | 3/1977 | Kaesser et al. ................. 415/181 |
| 4,876,491 A | * | 10/1989 | Squires et al. |
| 5,608,300 A |   | 3/1997 | Kawabata et al. |
| 6,670,784 B2 | * | 12/2003 | Odachi et al. ................. 318/700 |
| 7,084,598 B2 | * | 8/2006 | Yoshida et al. .......... 318/400.11 |
| 7,412,339 B2 | * | 8/2008 | Ramu et al. .................... 702/65 |
| 7,518,328 B2 | * | 4/2009 | Balsiger .................. 318/400.22 |
| 7,859,207 B2 | * | 12/2010 | Yamada et al. .......... 318/400.02 |
| 2005/0280382 A1 | * | 12/2005 | Viti ................................ 318/254 |
| 2008/0048598 A1 | * | 2/2008 | Shibuya .................... 318/400.1 |

FOREIGN PATENT DOCUMENTS

| EP | 0 251 785 | 8/1993 |
| JP | 2001-37284 | 2/2001 |
| JP | 2005-6453 | 1/2005 |

OTHER PUBLICATIONS

Japanese Office Action dated Jan. 28, 2010, issued in corresponding Japanese Application No. 2008-134194, with English translation.
Japanese Office Action dated Aug. 30, 2010, issued in corresponding Japanese Application No. 2008-134194, with English translation.

\* cited by examiner

*Primary Examiner* — Thomas Dougherty
(74) *Attorney, Agent, or Firm* — Nixon & Vanderhye PC

(57) ABSTRACT

An apparatus for estimating rotor position for brushless motors capable of accurately estimating rotor position even though power source voltage fluctuates is provided. First, the power source voltage is detected, and voltage is supplied only for a certain period of time and a current response is detected. The current detection value is multiplied by the ratio of a reference voltage to the power source voltage detected to correct the current detection value. Specifically, the peak current detection value is corrected upwardly or downwardly in each direction. A voltage supplying direction in which the current detection value is maximized is searched for to estimate the rotor position and a brushless motor is started.

29 Claims, 9 Drawing Sheets

|    | Su+ | Sv+ | Sw+ | Su− | Sv− | Sw− |
|----|-----|-----|-----|-----|-----|-----|
| V1 | ON  | OFF | OFF | OFF | ON  | ON  |
| V2 | ON  | ON  | OFF | OFF | OFF | ON  |
| V3 | OFF | ON  | OFF | ON  | OFF | ON  |
| V4 | OFF | ON  | ON  | ON  | OFF | OFF |
| V5 | OFF | OFF | ON  | ON  | ON  | OFF |
| V6 | ON  | OFF | ON  | OFF | ON  | OFF |

| DIRECTION | V1 | V2 | V3 | V4 | V5 | V6 |
|---|---|---|---|---|---|---|
| ROTOR POSITION | I | II | III | IV | V | VI |
| COMMUTATION DIRECTION | 30deg | 90deg | 150deg | 210deg | 270deg | 330deg |

|  | Su+ | Sv+ | Sw+ | Su− | Sv− | Sw− |
|---|---|---|---|---|---|---|
| 30deg | ON | OFF | OFF | OFF | OFF | ON |
| 90deg | OFF | ON | OFF | OFF | OFF | ON |
| 150deg | OFF | ON | OFF | ON | OFF | OFF |
| 210deg | OFF | OFF | ON | ON | OFF | OFF |
| 270deg | OFF | OFF | ON | OFF | ON | OFF |
| 330deg | ON | OFF | OFF | OFF | ON | OFF |

APPARATUS FOR ESTIMATING ROTOR POSITION OF BRUSHLESS MOTORS AND SYSTEM AND METHOD FOR CONTROLLING START-UP OF BRUSHLESS MOTORS

CROSS REFERENCE TO RELATED APPLICATION

This application is based on Japanese Patent Application No. 2008-134194 filed on May 22, 2008, the contents of which are incorporated herein by reference in its entirety.

FIELD OF THE INVENTION

The present invention relates to a technology for estimating the rotor position of a brushless motor and in particular to a technology for performing start-up of brushless motors.

BACKGROUND OF THE INVENTION

There have been conventionally known brushless motors in which a coil is placed on the stator side and a rotor having magnetic poles is rotated and thus a brush in contact with the rotor is eliminated. In such a brushless motor, it is required to estimate the position where the rotor is at a stop (hereafter, referred to as "rotor position") when the motor is started. However, it is difficult to estimate rotor position unlike in motors having a brush.

The simplest method for estimating the rotor position of a brushless motor is to detect it with a sensor. In this case, however, increase in the number of parts and other like problems result. To cope with this, there have been conventionally proposed methods of supplying voltage to a coil installed in a stator and estimating the rotor position from change in the current passed through the coil. (Refer to Patent Document 1, for example.)

In the technology disclosed in the above patent document, rotor position is estimated by: supplying voltage so that magnetic flux in the direction perpendicular to the direction of rotation of a rotor is produced at predetermined angular intervals; and measuring the magnitude of wiring current that is the current passed through a coil. More specific description will be given. When so-called magnetic saturation, in which change in magnetic flux density is reduced even though current is increased, occurs in a coil, the inductance of the coil under a certain voltage is reduced. For this reason, a phenomenon of increase in current occurs. At this time, magnetic saturation is prone to occur by the magnetic flux produced by the rotor itself at an angle corresponding to the rotor position. In conventional technologies, therefore, rotor position is estimated by: supplying voltage more than once so that the direction of magnetic flux is changed at predetermined angular intervals; and detecting the wiring current in each case and comparing the peak of the wiring current.

(Patent Document 1) JP-A-S63-69489 (USP4876491)

It will be assumed that a brushless motor is used for a vehicle fuel pump. In this case, voltage supplied to a coil is from a vehicle battery and thus there is a possibility of fluctuation in voltage. For example, voltage drop may be caused by vehicle electric equipment or voltage rise may be caused by a battery externally connected at the time of failure or the like.

In the technology disclosed in Patent Document 1, at this time, voltage is supplied so that magnetic flux in the direction perpendicular to the direction of rotation of the rotor is produced at predetermined angular intervals and the magnitude of wiring current is measured. The technology is on the assumption that voltage is constant in every direction of comparison. However, if power source voltage fluctuates in midstream when a vehicle battery is used or on other like occasions, the comparison of wiring current peak does not make sense anymore and the accuracy of rotor position estimation is degraded.

SUMMARY OF THE INVENTION

The invention has been made to solve the above-mentioned problem.

It is an object of the invention to enable an accurate estimation of rotor position even though power source voltage fluctuates.

In one of preferred embodiments of the present invention, an apparatus for estimating rotor position for brushless motors is provided. The brushless motor has a stator with coils wound thereon and a rotor rotatably supported relative to the stator, the apparatus estimates the stop position of the rotor. The estimating apparatus comprises a current detecting means for directly or indirectly detecting wiring current which is current passed through the coils, a voltage supplying means capable of supplying voltage to the coils so that magnetic flux is produced in each of a plurality of directions perpendicular to the direction of rotation of the rotor, a power source voltage detecting means for detecting the voltage of a power source used for the voltage supply, a voltage supply controlling means which controls the voltage supplying means so that magnetic flux is produced in sequence in predetermined directions among the directions and, when a predetermined voltage supply time has passed, terminates the supply of voltage by the voltage supplying means, and a current correcting means which corrects wiring current detected at the current detecting means based on power source voltage detected at the power source voltage detecting means and preset reference voltage in each direction in which magnetic flux is produced under control of the voltage supply controlling means. The estimating apparatus further comprises a rotor position estimating means which compares wiring currents corrected by the current correcting means to identify a direction in which the peak amplitude value of wiring current is maximized and estimates the stop position of the rotor based on the identified direction.

According to the estimating apparatus, the voltage is supplied to the stator coil for each one of the predetermined direction. The power source voltages are detected for each of the direction. Therefore, the current values are corrected based on the power source voltage detected in the corresponding one of the directions. As a result, it is possible to obtain the corrected current values each is corrected based on the power source voltage detected on the corresponding direction. The corrected current values enable to determine the stop position of the rotor even if the power source voltage is fluctuated during the voltage supplying sequence.

In the other one of preferred embodiments of the present invention, a start-up control system for brushless motors is provided. The brushless motor has a stator with coils wound thereon and a rotor rotatably supported relative to the stator. The system carries out start-up control on the brushless motor. The system comprises, a current detecting means for directly or indirectly detecting wiring current which is current passed through the coils, a voltage supplying means capable of supplying voltage to the coils so that magnetic flux is produced in each of a plurality of directions perpendicular to the direction of rotation of the rotor, a power source voltage detecting means for detecting the voltage of a power source used for the voltage supply, a voltage supply controlling means which controls the voltage supplying means so that magnetic flux is produced in sequence in predetermined directions among the directions and, when a predetermined voltage supply time has passed, terminates the supply of voltage by the voltage supplying means, and a current correcting means which corrects wiring current detected at the current detecting means based on power source voltage detected at the power source voltage detecting means and preset reference voltage in each direction in which magnetic flux is produced under control of the voltage supply controlling means. The system further comprises a rotor position estimating means which compares wiring currents corrected by the current correcting means to identify a direction in which the peak amplitude value of wiring current is maximized and estimates the stop position of the rotor based on the identified direction, and a motor start-up controlling means which determines a direction of magnetic flux for causing commutation in the rotor from among the directions based on the stop position of the rotor estimated at the rotor position estimating means, and controls the voltage supplying means so as to produce magnetic flux in that direction and starts the brushless motor.

According to the start-up controlling system, the corrected current values enable to determine the stop position of the rotor even if the power source voltage is fluctuated during the voltage supplying sequence. It is possible to start the brushless motor based on the estimated stop position of the rotor.

In the other one of preferred embodiments of the present invention, a start-up control method for brushless motors is provided. The brushless motor has a stator with coils wound thereon and a rotor rotatably supported relative to the stator. The method is used to carry out start-up control on the brushless motor. The method comprises, first step of detecting the voltage of a power source for supplying voltage to the coils, second step of supplying voltage to the coils so that magnetic flux is produced in predetermined directions among a plurality of directions perpendicular to the direction of rotation of the rotor, third step of detecting wiring current which is current passed through the coils, fourth step of, when a voltage supply time has passed, terminating the supply of the voltage, fifth step of correcting the wiring current based on power source voltage detected at the first step and predetermined reference voltage, and sixth step of repeating the steps including the first step to the fifth step in all the predetermined directions. The method further comprises seventh step of comparing wiring currents corrected at the fifth step to identify a direction in which the peak amplitude value of wiring current is maximized from among the predetermined directions and estimating the stop position of the rotor based on the identified direction, and eighth step of determining a direction of magnetic flux for causing commutation in the rotor from among the directions based on the estimated stop position of the rotor, and controlling the voltage supplying means so as to produce magnetic flux in that direction and starting the brushless motor.

According to the start-up control method, the corrected current values enable to determine the stop position of the rotor even if the power source voltage is fluctuated during the voltage supplying sequence. It is possible to start the brushless motor based on the estimated stop position of the rotor.

In the other one of preferred embodiments of the present invention, an apparatus for estimating rotor position for brushless motors is provided. The brushless motor has a stator with coils wound thereon and a rotor rotatably supported relative to the stator and estimates the stop position of the rotor. The estimating apparatus comprises, a current detecting means for directly or indirectly detecting wiring current which is current passed through the coils, a voltage supplying means capable of supplying voltage to the coils so that magnetic flux is produced in each of a plurality of directions perpendicular to the direction of rotation of the rotor, a power source voltage detecting means for detecting the voltage of a power source used for the voltage supply in each of the predetermined directions, a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means, a supply period acquiring means which acquires a period equivalent value equivalent to a voltage supply period in each direction in which magnetic flux is produced under control of the voltage supply controlling means, and a period value correcting means which corrects a period equivalent value acquired at the supply period acquiring means based on power source voltage detected at the power source voltage detecting means and predetermined reference voltage. The apparatus further comprises a rotor position estimating means which compares period equivalent values corrected by the period value correcting means to identify a direction in which the voltage supply period is minimized and estimates the stop position of the rotor based on the identified direction.

According to the estimating apparatus, the voltage is supplied to the stator coil for each one of the predetermined direction. The voltage is supplied until current value reaches to a predetermined threshold. Simultaneously, a period of time from beginning of voltage supply to terminating voltage supply is detected. The predetermined threshold can be set at a value where the coil reaches to a magnetically saturated condition. The power source voltages are detected for each of the direction. Therefore, a period equivalent value, which may be a voltage supplying time period itself is corrected based on the power source voltage detected in the corresponding one of the directions. As a result, it is possible to obtain the corrected period equivalent values each is corrected based on the power source voltage detected on the corresponding direction. The corrected period equivalent values enable to determine the stop position of the rotor even if the power source voltage is fluctuated during the voltage supplying sequence. Further it is possible to saturate the stator coil and enable to avoid lowering of estimating accuracy.

In the other one of preferred embodiments of the present invention, a start-up control system for brushless motors is provided. The brushless motor has a stator with coils wound thereon and a rotor rotatably supported relative to the stator. The system carries out start-up control on the brushless motor. The system comprises, a current detecting means for directly or indirectly detecting wiring current which is current passed through the coils, a voltage supplying means capable of supplying voltage to the coils so that magnetic flux is produced in each of a plurality of directions perpendicular to the direction of rotation of the rotor, a power source voltage detecting means for detecting the voltage of a power source used for the voltage supply, a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means, and a supply period acquiring means which acquires a period equivalent value equivalent to a voltage supply period in each direction in which magnetic flux is produced under control of the voltage supply controlling means, and a period value correcting means which corrects a period equivalent value acquired at the supply period acquiring means based on power source voltage detected at the power source voltage detecting means and predetermined reference voltage. The system further comprises a rotor position estimating means which compares period equivalent values corrected by the period value correcting means to identify a direction in which the voltage supply period is minimized and estimates the stop position of the rotor based on the identified direction, and a motor start-up controlling means which determines a direction of magnetic flux for causing commutation in the rotor from among the directions based on the stop position of the rotor estimated at the rotor position estimating means, and controls the voltage supplying means so as to produce magnetic flux in that direction and starts the brushless motor.

According to the start-up control system, the corrected period equivalent values enable to determine the stop position of the rotor even if the power source voltage is fluctuated during the voltage supplying sequence. It is possible to start the brushless motor based on the estimated stop position of the rotor.

In the other one of preferred embodiments of the present invention, a start-up control method for brushless motors is provided. The brushless motor has a stator with coils wound thereon and a rotor rotatably supported relative to the stator. The method is used to carry out start-up control on the brushless motor. The method comprises, first step of detecting the voltage of a power source for supplying voltage to the coils, second step of supplying voltage to the coils so that magnetic flux is produced in predetermined directions among a plurality of directions perpendicular to the direction of rotation of the rotor and starting counting at the same time, third step of determining that wiring current which is current passed through the coils has exceeded a predetermined threshold value, fourth step of, when the wiring current is determined to have exceeded the predetermined threshold value, terminating the supply of the voltage and terminating counting, fifth step of correcting a count corresponding to the voltage supply period based on power source voltage detected at the first step and predetermined reference voltage, and sixth step of repeating the steps including the first step to the fifth step in all the predetermined directions. The method further comprises seventh step of comparing counts corrected at the fifth step to identify a direction in which the count is minimized from among the predetermined directions and estimating the stop position of a rotor based on the identified direction, and eighth step of determining a direction of magnetic flux for causing commutation in the rotor from among the directions based on the estimated stop position of the rotor, and controlling the voltage supplying means so as to produce magnetic flux in that direction and starting the brushless motor.

According to the start-up control method, the corrected period equivalent values enable to determine the stop position of the rotor even if the power source voltage is fluctuated during the voltage supplying sequence. It is possible to start the brushless motor based on the estimated stop position of the rotor.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Hereafter, description will be given to embodiments of the invention with reference to the drawings.

First Embodiment

Figure 1:
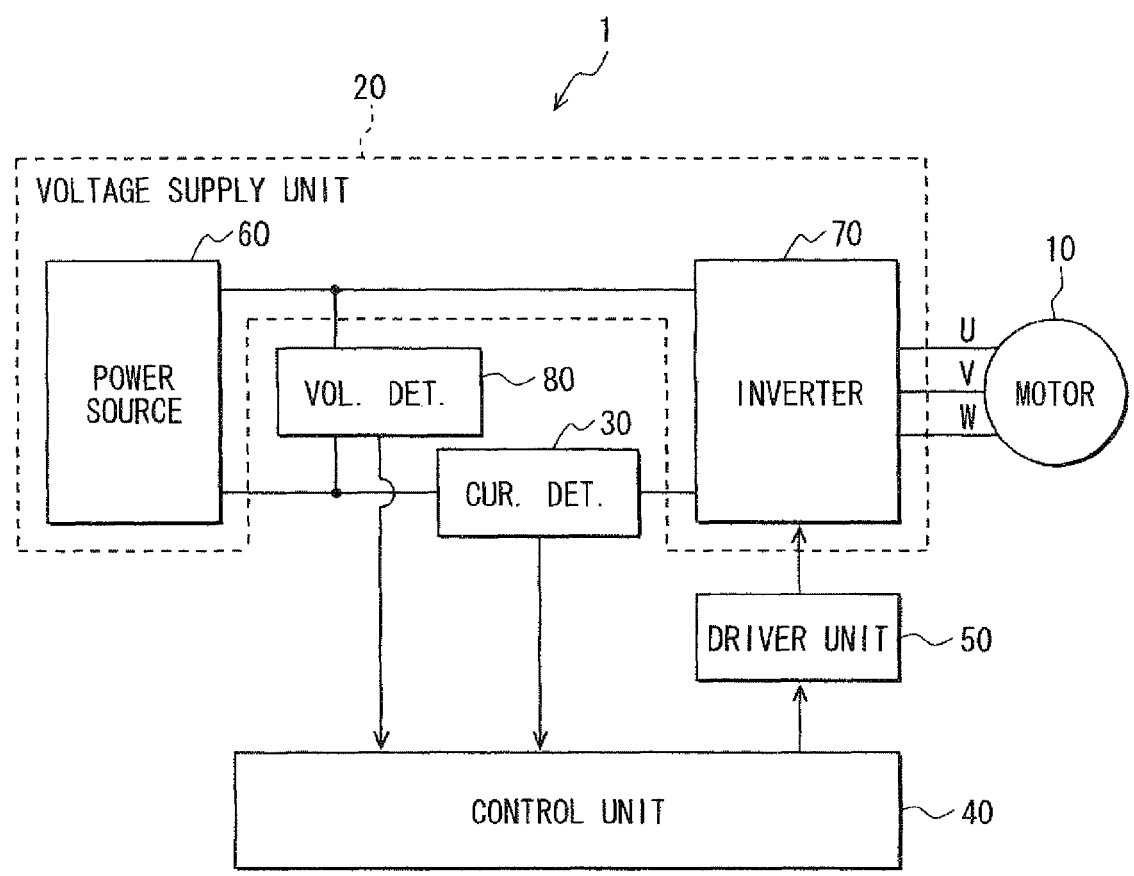
FIG. 1 is a block diagram illustrating a start-up control system for brushless motors in first and second embodiments of the invention.

FIG. 1 is a block diagram illustrating the general configuration of a start-up control system 1 for brushless motors in the first embodiment. The start-up control system 1 for brushless motors in this embodiment is used to drive a vehicle fuel pump.

The start-up control system 1 for brushless motors includes a motor 10, a voltage supply unit 20, a current detection unit 30, a control unit 40, a driver circuit 50, and a voltage detection unit 80.

Figures 4A, 4B:
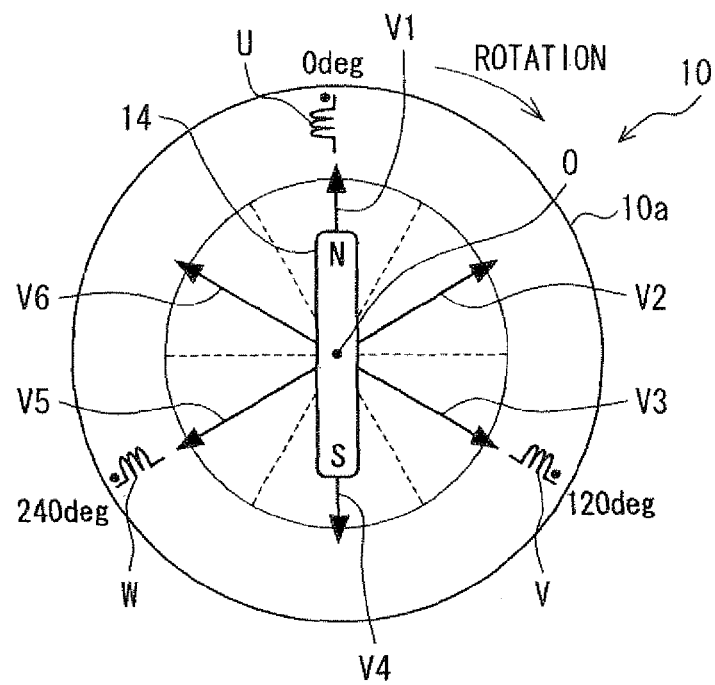
FIG. 4A is an explanatory drawing illustrating the directions of voltage supply in the first and second embodiments.
FIG. 4B is an explanatory drawing illustrating switching of FETs corresponding to the directions of voltage supply.

The motor 10 is a so-called brushless motor and has a stator 10a and a rotor 14 (FIG. 4A) that is rotated against the stator 10a. The rotor 14 is supported rotatably relative to the stator 10a. The rotor 14 in FIG. 4A is depicted like a rod; however, the actual rotor is a disk-shaped or cylindrical member and a permanent magnet is stuck to its surface so that it has magnetic poles. In FIG. 4A, the rotor 14 is schematically depicted as having a north pole and a south pole. The stator 10a houses the rotor 14 therein and rotatably supports it. The rotor 14 illustrated in FIG. 4A is rotated clockwise with the point O taken as the center of rotation.

Description will be back to FIG. 1. The voltage supply unit 20 includes a power source 60 and an inverter 70. The voltage supply unit 20 may be called as a power supply unit. The power source 60 is a vehicle battery. Voltage produced by this power source 60 will be hereafter referred to as "power source voltage." The inverter 70 is a switching circuit for supplying voltage to a coil wound on the stator of the motor 10.

The current detection unit 30 is electrically connected between the power source 60 and the inverter 70 and detects current passed through a coil. In more detail, it detects voltage in proportion to current. The voltage detection unit 80 detects power source voltage.

The control unit 40 controls the inverter 70 through the driver circuit 50. Measurement values from the current detection unit 30 and the voltage detection unit 80 are inputted to the control unit 40.

Figure 2:
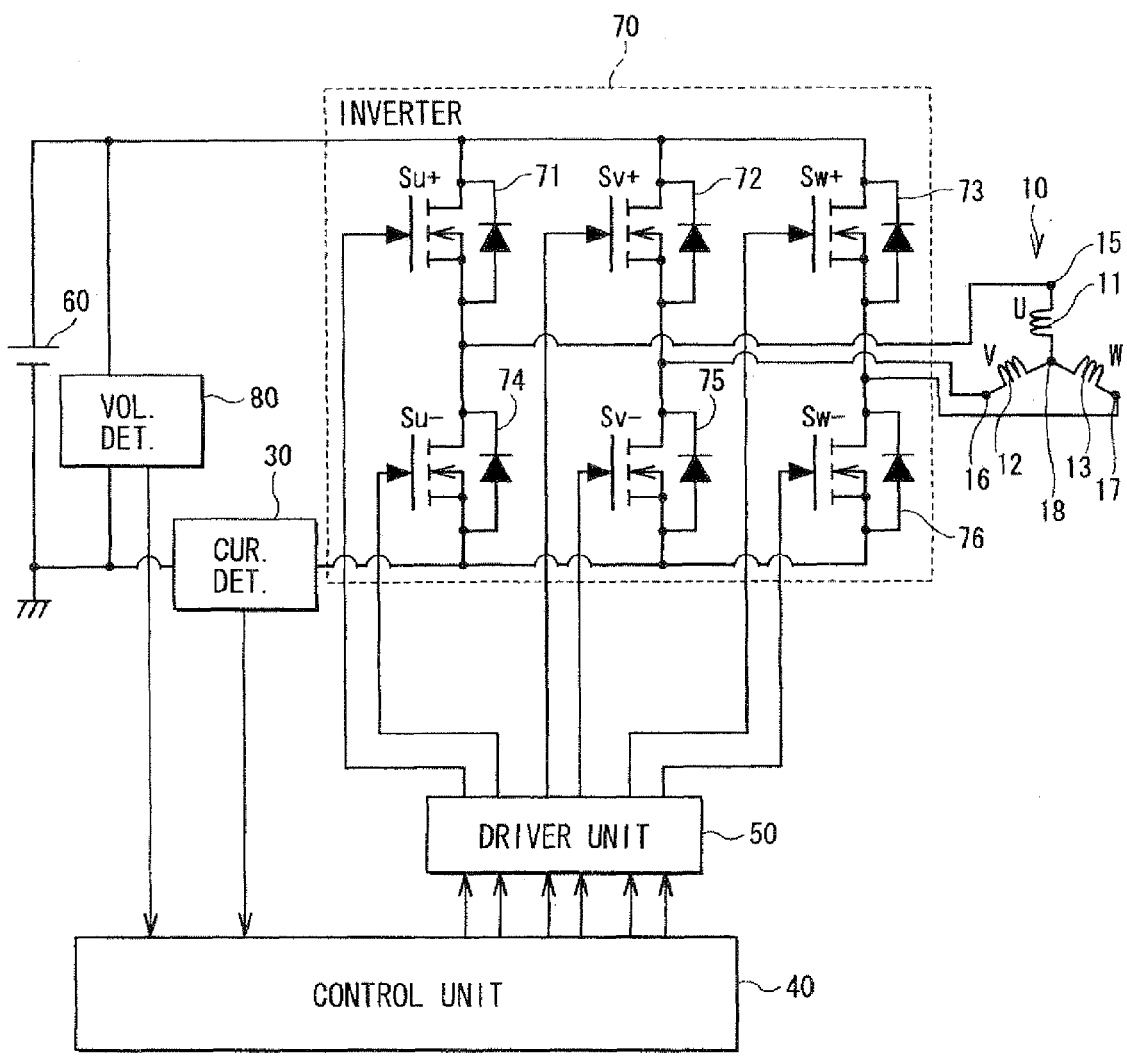
FIG. 2 is a circuit diagram illustrating a start-up control system for brushless motors in the first and second embodiments of the invention.

Description will be given to the circuitry of the start-up control system 1 for brushless motors with reference to FIG. 2.

As mentioned above, the motor 10 has a stator and a rotor. This stator has protruded portions protruded inward in the radial direction at predetermined angular intervals and three phase coils 11, 12, 13 are wound on these protruded portions. Specifically, a U-phase coil 11, a V-phase coil 12, and a W-phase coil 13 are wound. It is the above-mentioned inverter 70 to change the mode of voltage supply to the three phase coils 11, 12, 13.

The inverter 70 is constructed of six MOSFETs (Metal Oxide-Semiconductor Field-Effect Transistors) 71, 72, 73, 74, 75, 76, each of which is a type of field-effect transistor. These MOSFETS 71 to 76 function as switching elements and the section between their respective source and drain is turned ON (brought into conduction) or OFF (interrupted) according to the potential of their respective gates. Hereafter, the MOSFETs 71 to 76 will be described simply as FETs 71 to 76. When it is required to discriminate each of the six FETs 71 to 76 from the others, the symbols in FIG. 2 will be used and they will be described as FET(Su+) 71, FET(Sv+) 72, FET(Sw+) 73, FET(Su−) 74, FET(Sv−) 75, and FET(Sw−) 76.

Description will be given to the connection between the FETs 71 to 76. The drains of three FETs 71 to 73 are connected to power source voltage. The sources of these FETs 71 to 73 are respectively connected to the drains of the remaining three FETs 74 to 76. The sources of these FETs 74 to 76 are grounded through the current detection unit 30. The gates of the six FETs 71 to 76 are connected to six output terminals of the driver circuit 50. Owing to this configuration, the control unit 40 can individually switch the six FETs 71 to 76 between ON and OFF through the driver circuit 50.

The point of junction between the FET(Su+) 71 and the FET(Su−) 74 is connected to one end 15 of the U-phase coil 11. The point of junction between the FET(Sv+) 72 and the FET(Sv−) 75 is connected to one end 16 of the V-phase coil 12. The point of junction between the FET(Sw+) 73 and the FET(Sw−) 76 is connected to one end 17 of the W-phase coil 13. The other ends of the U-phase coil 11, V-phase coil 12, and W-phase coil 13 are connected together to form other end portion 18.

An example of the current detection unit 30 is configured as a circuit for measuring the potential difference between both ends of a shunt resistor. In this example, voltage in proportion to current is measured. The results of measurement are outputted to the control unit 40. As mentioned above, the voltage detection unit 80 measures power source voltage. The results of this measurement are also outputted to the control unit 40.

Description will be given to the operation of the start-up control system 1 for brushless motors in this embodiment.

Figure 3:
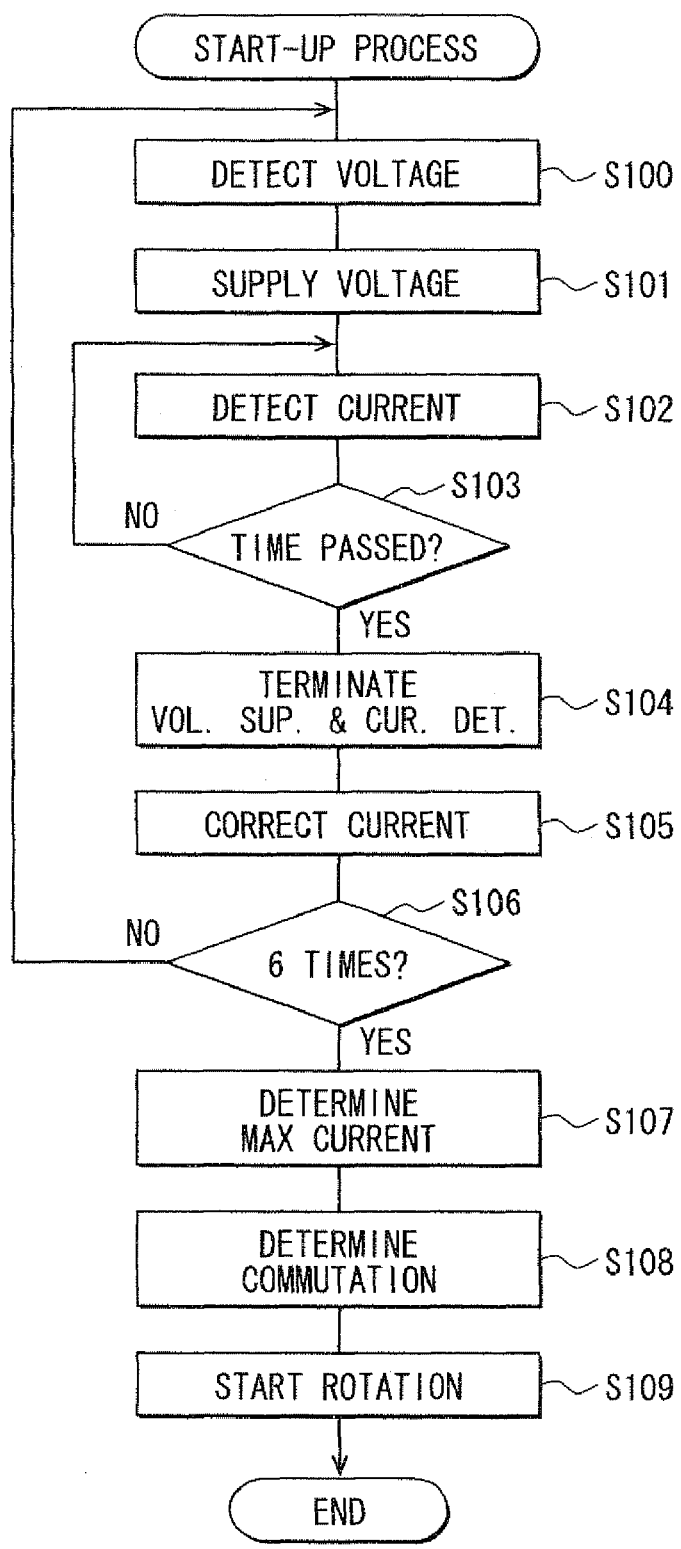
FIG. 3 is a flowchart illustrating start-up processing carried out by a control unit in the first embodiment.

FIG. 3 is a flowchart illustrating start-up processing carried out at the control unit 40. At the first step, Step S100, power source voltage is detected. (Hereafter, "Step" will be omitted and each step will be simply indicated by symbol S.) This processing is achieved by acquiring the result of measurement from the voltage detection unit 80. (Refer to FIG. 2.) At S101, subsequently, voltage is supplied. This processing is achieved by supplying voltage to the three phase coils 11, 12, 13 wound on the stator of the motor 10.

Description will be given to voltage supply to the three phase coils 11, 12, 13 with reference to FIGS. 4A and 4B.

FIG. 4A is an explanatory drawing illustrating the directions of magnetic flux produced by supplying voltage to the three phase coils 11, 12, 13. The directions of magnetic flux produced by voltage supply are set clockwise at intervals of 60 degrees. In FIG. 4A, the directions of magnetic flux are indicated by arrows V1, V2, V3, V4, V5, and V6. These lines of magnetic flux can be produced by varying the mode of voltage supply by appropriately combining turn-ONs and -OFFs of the FETs 71 to 76. To produce magnetic flux in the direction indicated by arrow V1 in FIG. 4A, for example, the FETs are turned ON or OFF as illustrated in FIG. 4B. That is, the FET(Su+) 71 is turned ON; the FET(Sv+) 72 is turned OFF; the FET(Sw+) 73 is turned OFF; the FET(Su−) 74 is turned OFF; the FET(Sv−) 75 is turned ON; and the FET (Sw−) 76 is turned ON. In this case, power source voltage is supplied to the one end 15 of the U-phase coil 11 and the one ends 16, 17 of the V-phase coil 12 and the W-phase coil 13 are brought to low potential. Therefore, current flows from the U-phase coil 11 to the other end portion 18 to the V-phase coil 12 and the W-phase coil 13. As a result, magnetic flux in the direction indicated by arrow V1 is produced. To produce magnetic flux in the direction indicated by arrow V2, the FETs 71 to 76 are respectively turned ON, ON, OFF, OFF, OFF, and ON as illustrated in FIG. 4B. Similarly, magnetic flux in the direction indicated by arrow V3 is produced by respectively turning OFF, ON, OFF, ON, OFF, and ON the FETs 71 to 76. Magnetic flux in the direction indicated by arrow V4 is produced by respectively turning OFF, ON, ON, ON, OFF, and OFF the FETs 71 to 76; magnetic flux in the direction indicated by arrow V5 is produced by respectively turning OFF, OFF, ON, ON, ON, and OFF the FETs 71 to 76; and magnetic flux in the direction indicated by arrow V6 is produced by respectively turning ON, OFF, ON, OFF, ON, and OFF the FETs 71 to 76. In the following description, the direction of magnetic flux produced by voltage supply will be referred to as "voltage supplying direction." When the directions of arrows V1 to V6 are specially cited, they will be referred to as voltage supplying direction V1, voltage supplying direction V2, voltage supplying direction V3, voltage supplying direction V4, voltage supplying direction V5, and voltage supplying direction V6.

At S101 of the flow in FIG. 3, first, voltage in the voltage supplying direction V1 in FIG. 4A is supplied.

At S102, subsequently, current response detection is carried out. This processing is achieved by acquiring the result of measurement from the current detection unit 30. (Refer to FIG. 2.)

At S103, subsequently, it is determined whether or not a voltage supply time Tsv has passed. In this embodiment, the voltage supply time Tsv is constant. When it is determined that the voltage supply time Tsv has passed (S103: YES), the flow proceeds to S104. When the voltage supply time Tsv has not passed yet (S103: NO), the processing of S102 is repeated.

At S104, the detection of current is terminated. Therefore, the current detection value detected at S102 immediately before an affirmative determination is made at S103 is adopted. During the voltage supply time Tsv, the current steadily increases; therefore, the current detected at S102 present when the processing of S104 is terminated is a peak amplitude value. At S104, further, the supply of voltage is terminated. This processing is achieved by turning OFF all the FETs 71 to 76 and is carried out without fail by brining the respective gates of the FETs 71 to 76 to a predetermined potential through the driver circuit 50.

At S105, subsequently, the current detection value is corrected. This processing is carried out based on the power source voltage detected at S100. Specifically, the current detection value is multiplied by the ratio of a reference voltage to the power source voltage.

At S106, subsequently it is determined whether or not the number of times of voltage supply is "6." This processing is carried out to determine whether or not voltage has been supplied in all the voltage supplying directions V1 to V6. When the number of times of voltage supply is equal to "6" (S106: YES), the flow proceeds to S107. When the number of times of voltage supply is not equal to "6" (S106: NO), the processing of S100 and the following steps is repeated. As the result of the processing of S100 and the following steps being repeated, power source voltage is detected in each voltage supplying direction and voltage is supplied in the order of voltage supplying direction V1 to V2 to V3 to V4 to V5 to V6.

At S107, a voltage supplying direction in which the corrected current detection value is maximized is searched for. This processing is achieved by searching for the voltage supplying direction in which the corrected current detection value (peak amplitude value) is maximized from among the voltage supplying directions V1 to V6. At S108, subsequently, a voltage supplying direction in which forced commutation should be carried out is determined. At S109, subsequently, the motor 10 is started and then this start-up processing is terminated. The voltage supplying direction in which forced commutation is carried out will be described later.

To make the above-mentioned start-up processing more understandable, concrete description will be added with reference to FIGS. 5A to 5C, FIGS. 5D to 5F, and FIGS. 6A to 6C. First, description will be given to the processing of up to S107 in FIG. 3 with reference to FIGS. 5A to 5C, and FIGS. 5D to 5F and then to the processing of S108 and S109 with reference to FIGS. 6A to 6C.

Figure 5A:
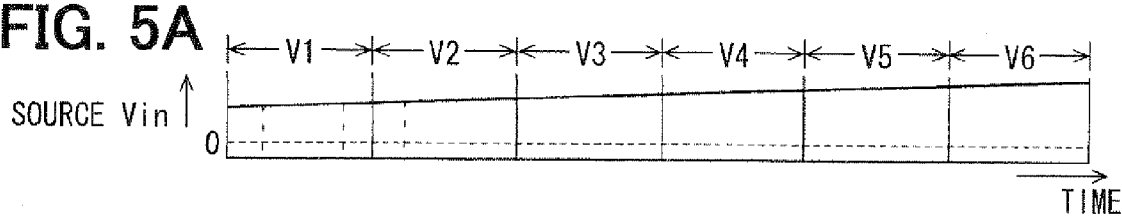
FIGS. 5A, 5B, and 5C are graphs attached as explanatory drawings illustrating the correspondence between the directions of voltage supply, power source voltage, supplied voltage, and wiring current in a comparative example in which current detection values are not corrected.
Figure 5B:
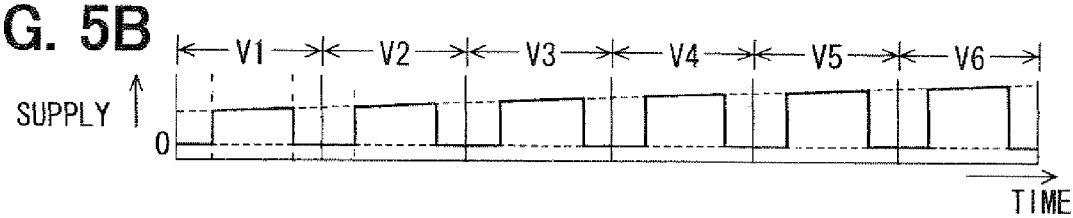
Figure 5C:
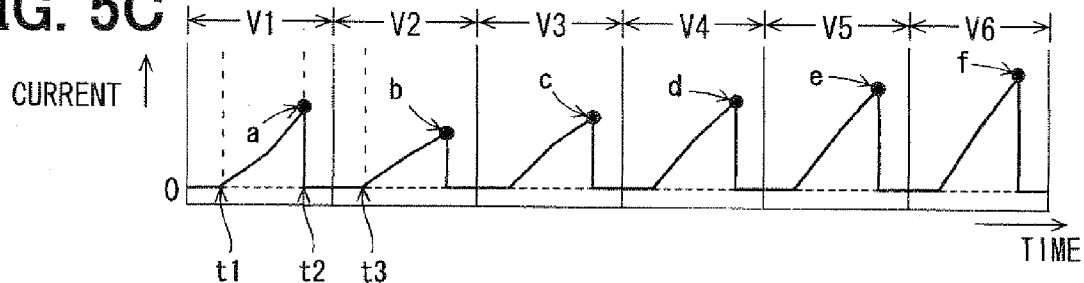
Figure 5D:
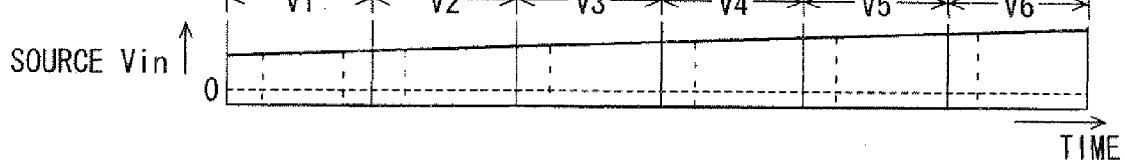
FIGS. 5D, 5E and 5F are graphs attached as explanatory drawings illustrating the above correspondence in the first embodiments in which current detection values are corrected.
Figure 5E:
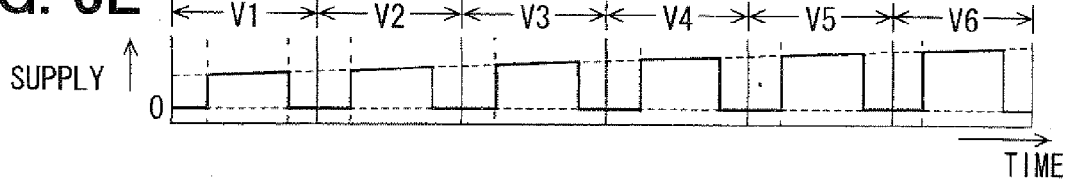
Figure 5F:
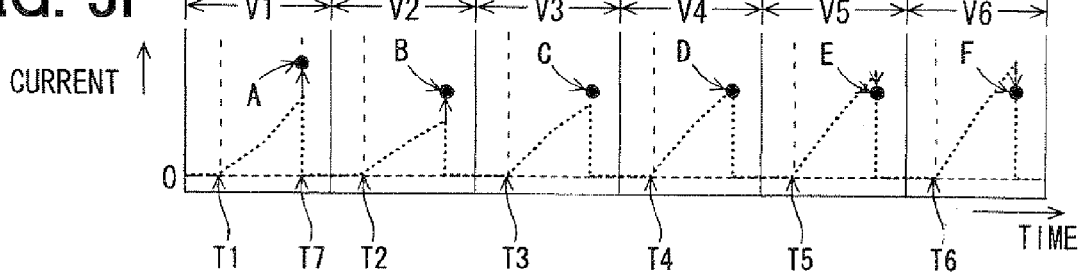

Each set of FIGS. 5A to 5C, and FIGS. 5D to 5F are explanatory drawings illustrating voltage supplying directions, power source voltage, supplied voltage, and wiring current in correspondence with one another. It will be assumed that the rotor 14 is at a stop so that its north pole faces toward the voltage supplying direction V1. Here, the description will be given on the assumption that the power source voltage Vin increases with time and the supplied voltage also rises in conjunction therewith. FIGS. 5A to 5C illustrates a comparative example in which the current detection values are not corrected and FIGS. 5D to 5F illustrates a case in this embodiment in which the current detection values are corrected.

When voltage is supplied first at time t1 as illustrated in FIG. 5B, the current of the three phase coils 11, 12, 13 steadily increases as shown in FIG. 5C. At time t2 when a certain period of time has passed, the supply of voltage is terminated as shown in FIG. 5B. Since voltage has been supplied only in one direction at this time, voltage is supplied in another direction at time t3. Thus voltage is supplied in all the voltage supplying directions V1 to V6. (Refer to FIG. 4A). The wiring current steadily increases as illustrated in FIG. 5C and the current detection values (peak amplitude values) indicated by symbols (a) to (f) in FIG. 5C are detected and compared.

Since the power source voltage Vin increases with time, however, the current detection values also become larger. In the example in FIGS. 5A to 5C, therefore, the current detection value (indicated by symbol (f) in the drawing) corresponding to the voltage supplying direction V6 is highest and thus the rotor position cannot be accurately estimated.

Referring to the set of FIGS. 5D to 5F, in this embodiment, consequently, the following measure is taken when voltage is similarly supplied (at S101 in FIG. 3): at time T1 in prior to the supply of voltage, power source voltage is detected (S100). Description will be continued, letting the detected power source voltage be Vin. When voltage is supplied, the current of the three phase coils 11, 12, 13 steadily increases. When the certain period of time has passed (S103: YES), the supply of voltage is terminated at time T7 and at the same time, current detection is terminated (S104). At this time, the current detection value is multiplied by the ratio of the reference voltage Vs to the power source voltage Vin (Vs/Vin) to correct the current detection value (S105). For example, the peak of current indicated by symbol (a) in FIG. 5C is corrected upwardly as indicated by symbol (A) in FIG. 5F.

Voltage has been supplied only in one (voltage supplying direction V1) at this time (S106 in FIG. 3: NO). Therefore, voltage is supplied next at time T2 in the voltage supplying direction V2 (S101). Thus the processing is repeated so that voltage is supplied in all the voltage supplying directions V1 to V6. (Refer to FIG. 4A.)

Therefore, the corrected current detection value Ix' is expressed as described Ix'=Ix·(Vs/Vinx), where the following assumption is made: the peak current detection value in each direction is let to be Ix (x is an integer of 1 to 6; this is the same with the following); and the power source voltage detected at time T1, T2, T3, T4, T5, T6 in FIGS. 5D to 5F is let to be Vinx.

When voltage is supplied in the voltage supplying direction V6 and the number of times of voltage supply reaches "6" (S106: YES), a voltage supplying direction in which the corrected current detection value is maximized is searched for (S107). In the example in FIGS. 5D to 5F, the current detection value in the voltage supplying direction V1 is highest. Therefore, it is estimated that the north pole of the rotor 14 is positioned in the voltage supplying direction V1 (strictly within a predetermined angular range with this direction at the center).

Figures 6A, 6B, 6C:
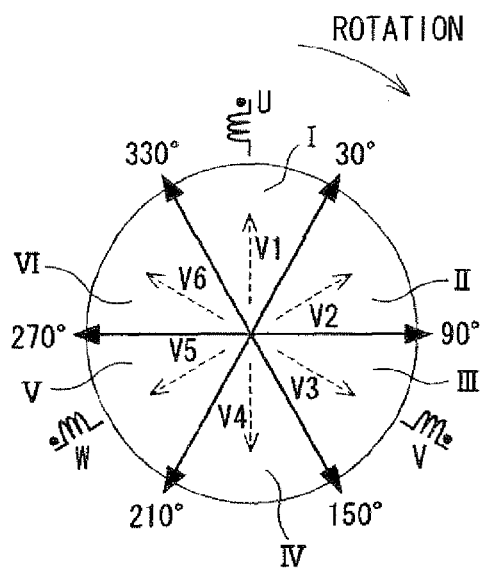
FIG. 6A is an explanatory drawing illustrating the directions of commutation voltage supply in the first and second embodiments.
FIG. 6B is an explanatory drawing illustrating the correspondence between the directions of voltage supply, the ranges of estimated rotor position, and the directions of commutation voltage supply in the first and second embodiments.
FIG. 6C is an explanatory drawing illustrating switching of FETs corresponding to the directions of commutation voltage supply.

FIG. 6A is an explanatory drawing illustrating directions (hereafter, referred to as "commutation voltage supplying direction") in which magnetic flux is produced for causing forced commutation in the rotor 14. FIG. 6B is an explanatory drawing illustrating the correspondence between the voltage supplying directions in which the time it takes to reach a current threshold value is minimized, the ranges of estimated rotor position, and commutation voltage supplying directions. FIG. 6C is an explanatory drawing illustrating turn-ONs and -OFFs of the FETs 71 to 76 corresponding to the commutation voltage supplying directions.

As illustrated in FIG. 6A, the commutation voltage supplying directions are respectively set in positions shifted by 30 degrees from the voltage supplying directions V1 to V6. When 0 degree is taken as the voltage supplying direction V1, specifically, the commutation voltage supplying directions are set in the directions of 30 degrees, 90 degrees, 150 degrees, 210 degrees, 270 degrees, and 330 degrees. Hereafter, the commutation voltage supplying directions will be indicated as 30 deg 90 deg 150 deg 210 deg 270 deg and 330 deg.

As mentioned above, the direction in which the corrected current detection value is maximized is searched for from among the voltage supplying directions V1 to V6 (S107 of the flow in FIG. 3). At this time, it is estimated that the north pole of the rotor 14 is positioned within the range of plus/minus 30 degrees of this direction, that is, within the range of 60 degrees. This range of estimated rotor position is as indicted as I, II, III, IV, V, and VI in FIG. 6A. When the voltage supplying direction in which the corrected current detection value is maximized is V1, for example, as illustrated in FIG. 6B, it is estimated that the range of estimated rotor position is I. Similarly, when the voltage supplying direction is V2, it is estimated that the range of estimated rotor position is the range of II; when the voltage supplying direction is V3, it is estimated that the range of estimated rotor position is the range of III; when the voltage supplying direction is V4, it is estimated that the range of estimated rotor position is the range of IV; when the voltage supplying direction is V5, it is estimated that the range of estimated rotor position is the range of V; and when the voltage supplying direction is V6, it is estimated that the range of estimated rotor position is the range of VI.

When the range of estimated rotor position is I, the commutation voltage supplying direction is 30 deg as illustrated in FIG. 6B. That is, commutation is caused clockwise in the rotor 14 by producing magnetic flux in the position closest to the estimated rotor range I in the clockwise direction. Similarly, when the range of estimated rotor position is II, the commutation voltage supplying direction is 90 deg. When the range of estimated rotor position is III, the commutation voltage supplying direction is 150 deg; when the range of estimated rotor position is IV, the commutation voltage supplying direction is 210 deg; when the range of estimated rotor position is V, the commutation voltage supplying direction is 270 deg; and when the range of estimated rotor position is VI, the commutation voltage supplying direction is 330 deg.

The commutation voltage supplying direction is determined based on the above correspondence (S108 of the flow in FIG. 3) and voltage is supplied to start the motor 10 (S109). Specifically, magnetic flux in each commutation voltage supplying direction is produced by switching the FETs 71 to 76 to change the mode of voltage supply to the U-phase coil 11, V-phase coil 12, and W-phase coil 13 as illustrated in FIG. 6C.

When the commutation voltage supplying direction is 30 deg for example, the FETs are turned ON or OFF as illustrated in FIG. 6C. That is, the FET(Su+) 71 is turned ON; the FET(Sv+) 72 is turned OFF; the FET(Sw+) 73 is turned OFF; the FET(Su−) 74 is turned OFF; the FET(Sv−) 75 is turned OFF; and the FET(Sw−) 76 is turned ON. In this case, power source voltage is supplied to the one end 15 of the U-phase coil 11 and the one end 17 of the W-phase coil 13 is brought to low potential (Refer to FIG. 2.) Therefore, current flows from the U-phase coil 11 to the other end portion 18 to the W-phase coil 13. As a result, magnetic flux is produced for the commutation voltage supplying direction of 30 deg. When the commutation voltage supplying direction is 90 deg the FETs 71 to 76 are respectively turned OFF, ON, OFF, OFF, OFF, and ON as illustrated in FIG. 6C. Similarly, magnetic flux for the commutation voltage supplying direction of 150 deg is produced by respectively turning OFF, ON, OFF, ON, OFF, and OFF the FETs 71 to 76. Magnetic flux for the commutation voltage supplying direction of 210 deg is produced by respectively turning OFF, OFF, ON, ON, OFF, and OFF the FETs 71 to 76; magnetic flux for the commutation voltage supplying direction of 270 deg is produced by respectively turning OFF, OFF, ON, OFF, ON, and OFF the FETs 71 to 76; and magnetic flux for the commutation voltage supplying direction of 330 deg is produced by respectively turning ON, OFF, OFF, OFF, ON, and OFF the FETs 71 to 76.

The motor 10 in this embodiment constitutes "brushless motor"; the current detection unit 30 constitutes "current detecting means"; the voltage supply unit 20 constitutes "voltage supplying means"; the control unit 40 constitutes "voltage supply controlling means," "current correcting means," "rotor position estimating means," and "motor start-up controlling means"; and the voltage detection unit 80 constitutes "power source voltage detecting means." The processing of S101, S103, S104 and S106 of the flow in FIG. 3 corresponds to the processing of "voltage supply controlling means"; the processing of S105 corresponds to the processing of "current correcting means"; the processing of S107 corresponds to the processing of "rotor position estimating means"; and the processing of S108 and S109 corresponds to the processing of "motor start-up controlling means." The processing of S100 of the flow in FIG. 3 corresponds to "Procedural Step (1)"; the processing of S101 corresponds to "Procedural Step (2)"; the processing of S102 corresponds to "Procedural Step (3)"; the processing of S103 and S104 corresponds to "Procedural Step (4)"; the processing of S105 corresponds to "Procedural Step (5)"; the processing of S106 corresponds to "Procedural Step (6)"; the processing of S107 corresponds to "Procedural Step (7)"; and the processing of S108 and S109 corresponds to "Procedural Step (8)."

Description will be given to the effect produced by the start-up control system 1 for brushless motors in this embodiment.

In this embodiment, first, power source voltage is detected (S100 of the flow in FIG. 3) and voltage is supplied for a certain period of time and a current response is detected (S101 to S104). The current detection value is multiplied by the ratio of a reference voltage to the power source voltage detected at S100 to correct the current detection value (S105). Specifically, the peak current detection value is corrected upward or downward in each direction as illustrated by symbols (A) to (F) in FIGS. 5A to 5C. The voltage supplying direction in which the current detection value is maximized is searched for (S107) to estimate the stop position of the rotor 14. According to this method, current detection values are corrected based on reference voltage; therefore, the rotor position can be accurately estimated even though power source voltage fluctuates. As a result, appropriate start-up of the motor 10 is achieved.

In this embodiment, power source voltage is detected (S100) prior to voltage supply (S101 of the flow in FIG. 3). Therefore, it is possible to appropriately detect power source voltage without influence of voltage drop due to voltage supply.

In this embodiment, further, the following processing is carried out when it is determined that the voltage supply time has passed (S103: YES): a current detection value detected at S102, that is, a peak amplitude value is corrected (S505). This eliminates waste in the processing as compared with such configurations that detected wiring current is corrected each time of detection.

Second Embodiment

The second embodiment is different from the first embodiment in start-up processing carried out at the control unit 40. Consequently, description will be given to the start-up processing and a characteristic part thereof and description of the same configurations as in the first embodiment will be omitted. The same constituent parts as in the first embodiment will be marked with the same reference numerals or symbols.

Figure 7:
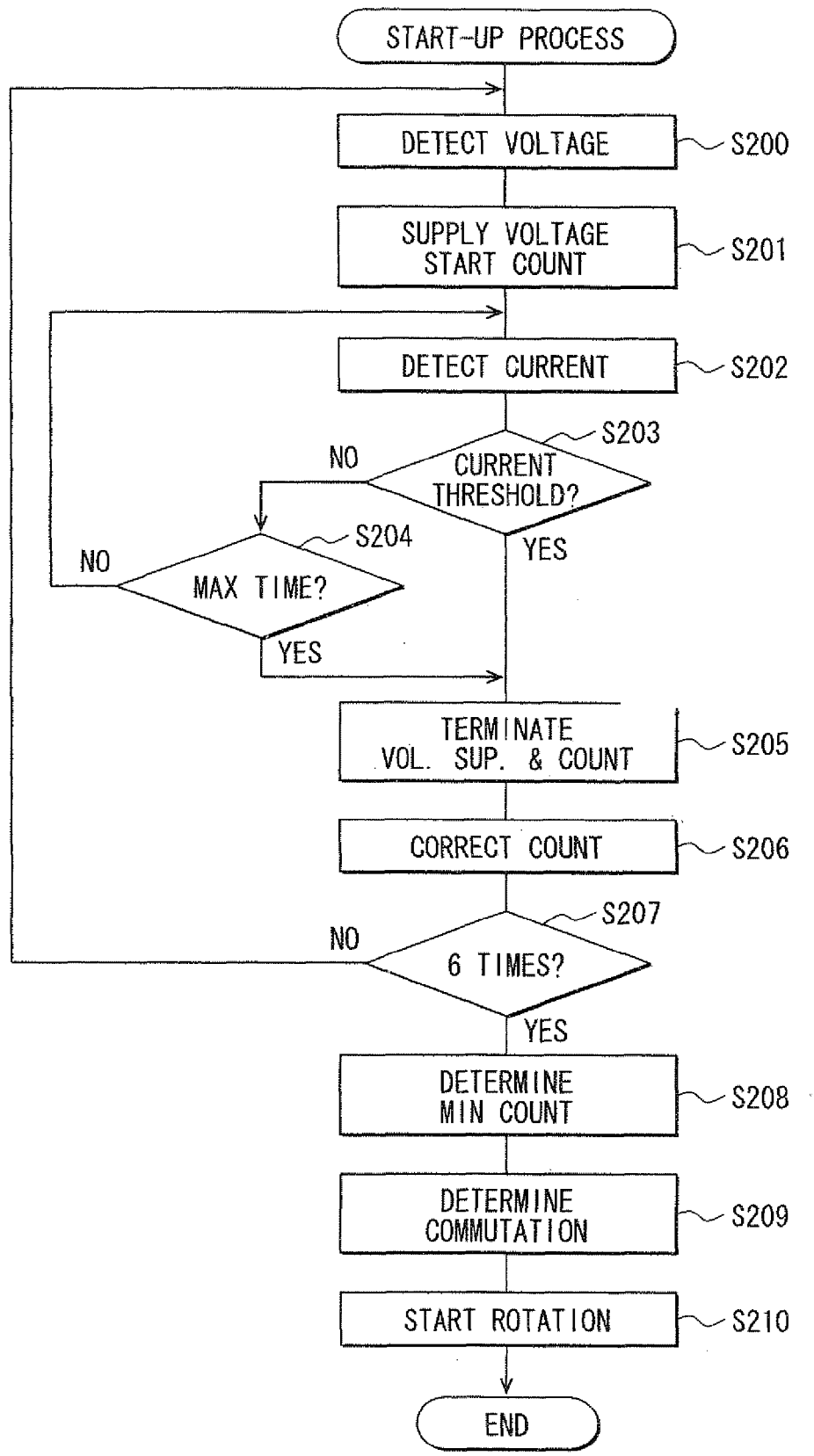
FIG. 7 is a flowchart illustrating start-up processing carried out by a control unit in the second embodiment.

FIG. 7 is a flowchart illustrating start-up processing carried out at the control unit 40. At the first step, Step S200, power source voltage is detected. (Hereafter, "Step" will be omitted and each step will be simply indicated by symbol S.) This processing is achieved by acquiring the result of measurement from the voltage detection unit 80. (Refer to FIG. 2.)

At S201, subsequently, voltage is supplied. This processing is achieved by supplying voltage to three phase coils 11, 12, 13 wound on the stator of the motor 10. In this example, first, voltage is supplied in the voltage supplying direction V1 in FIG. 4A. Counting is started when this voltage is supplied. This counting is carried out based on the operating clock of the control unit 40.

At S202, subsequently, current response detection is carried out. This processing is achieved by acquiring the result of measurement from the current detection unit 30. (Refer to FIG. 2.)

At S203, subsequently, it is determined whether or not a current threshold value has been reached. The current threshold value is predetermined and set within a range in which the three phase coils 11, 12, 13 are magnetically saturated. When it is determined at this step that the current threshold value has been reached (S203: YES), the flow proceeds to S205. When it is determined that the current threshold value has not been reached yet (S203: NO), the flow proceeds to S204.

At S204, it is determined whether or not a maximum voltage supply time has passed. When it is determined at this step that the maximum voltage supply time has passed (S204: YES), the flow proceeds to S205. The processing of S202 and the following steps is repeated as long as the maximum voltage supply time does not pass (S204: NO).

At S205, to which the flow proceeds when it is determined that the current threshold value has been reached (S203: YES) or when it is determined that the maximum voltage supply time has passed (S204: YES), the following processing is carried out: counting is terminated and the supply of voltage is terminated. The termination of voltage supply is implemented by bringing the respective gates of the FETs 71 to 76 to a predetermined potential through the driver circuit 50.

At S206, subsequently, the count is corrected. This processing is carried out based on the power source voltage detected at S200 and specifically, the count is multiplied by the ratio of a reference voltage to the power source voltage.

At S207, subsequently it is determined whether or not the number of times of voltage supply is "6." This processing is carried out to determine whether or not voltage has been supplied in all the voltage supplying directions V1 to V6. When the number of times of voltage supply is equal to "6" (S207: YES), the flow proceeds to S208. When the number of times of voltage supply is not equal to "6" (S207: NO), the processing of S200 and the following steps is repeated. As the result of the processing of S200 and the following steps being repeated, power source voltage is detected in each voltage supplying direction and voltage is supplied in the order of voltage supplying direction V1 to V2 to V3 to V4 to V5 to V6.

At S208, a voltage supplying direction in which the corrected count is minimized is searched for. This processing is achieved by searching for the voltage supplying direction in which the count is minimized from among the voltage supplying directions V1 to V6. At S209, subsequently, a voltage supplying direction in which forced commutation should be carried out is determined. At S210, subsequently, the motor 10 is started and then this start-up processing is terminated.

To make the above-mentioned start-up processing more understandable, concrete description will be added with reference to FIGS. 5A and 8B, FIGS. 8C to 8E, FIGS. 9A to 9D, and FIGS. 9E to 9I. First, description will be given to the processing with respect to counts in this embodiment with reference to FIGS. 8A and 8B, and FIGS. 8C to 8E, and then to the processing of up to S208 of the flow in FIG. 7 with reference to FIGS. 9A to 9D, and FIGS. 9E to 9I.

Figure 8A:
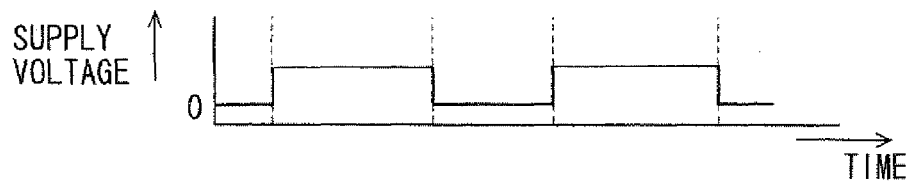
FIGS. 8A and 8B are graphs attached as explanatory drawings illustrating a comparative example.
Figure 8B:
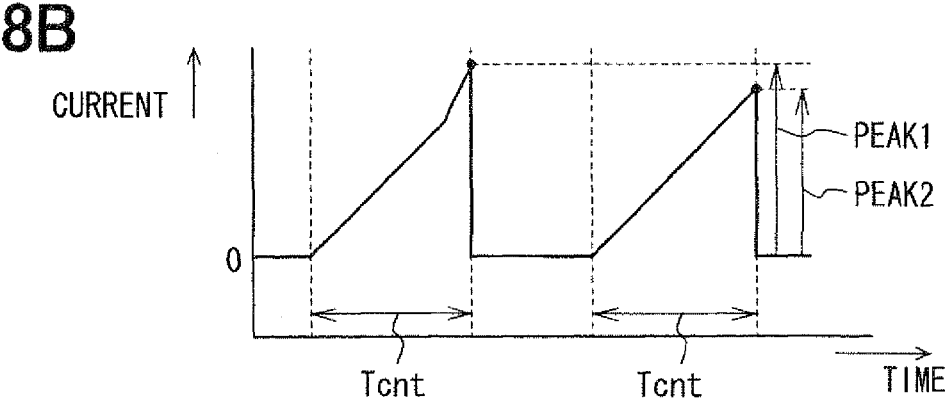
Figure 8C:
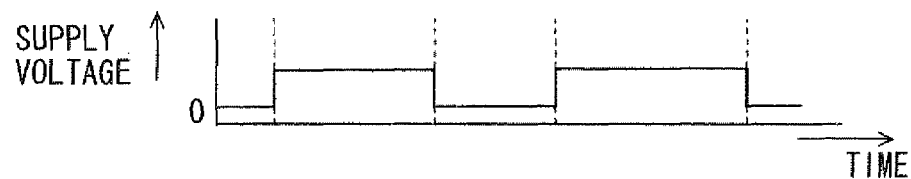
FIGS. 8C to 8E are graphs attached as explanatory drawings illustrating waveforms of the second embodiment.

In the above-mentioned embodiment, the voltage supply time Tcnt is constant as illustrated in FIGS. 8A and 8B. When voltage is supplied in each direction only for a certain period of time, magnetic saturation is prone to occur in the rotor position by the magnetic flux produced by the rotor 14 itself. Consequently, the peak amplitude values PEAK1 and PEAK2 of current are compared.

Figure 8D:
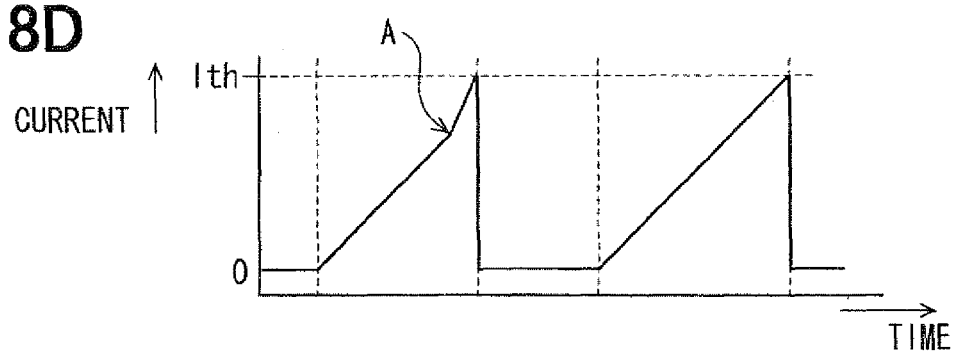
Figure 8E:
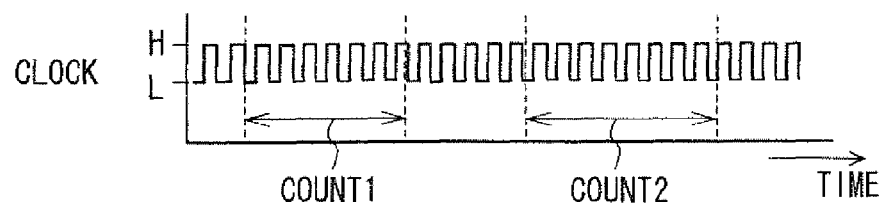
Figure 9A:
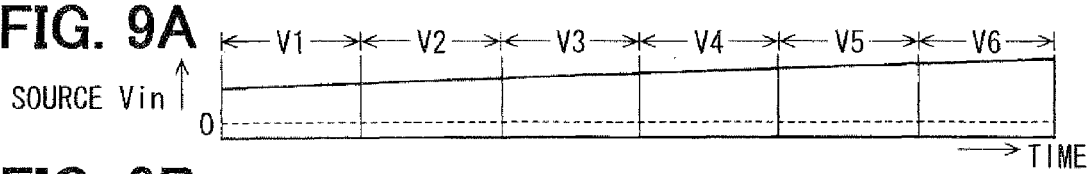
FIGS. 9A to 9D are graphs attached as explanatory drawings illustrating the correspondence between the directions of voltage supply, power source voltage, supplied voltage, wiring current, and a count signal in a comparative example in which counts are not corrected.
Figure 9B:
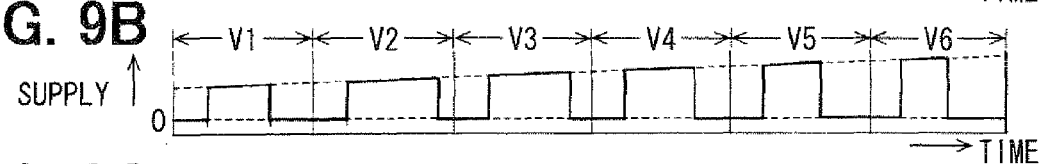
Figure 9C:
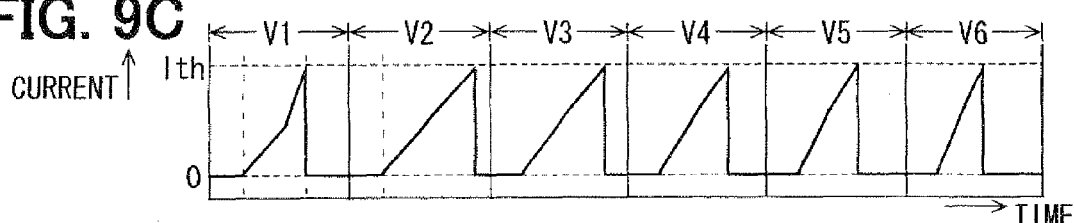
Figure 9D:
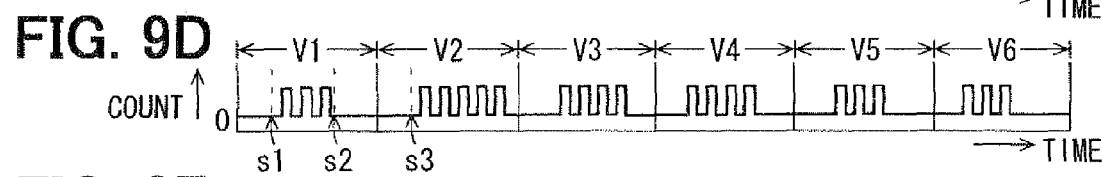
Figure 9E:
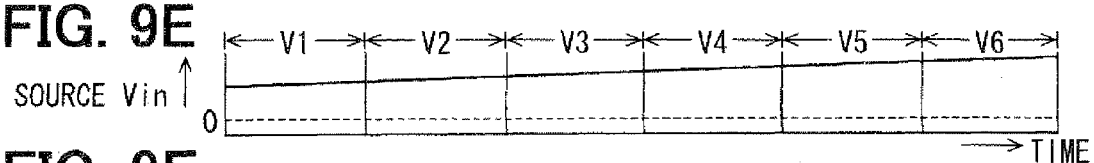
FIGS. 9E to 9I are graphs attached as explanatory drawings illustrating the above correspondence in the second embodiment in which counts are corrected.
Figure 9F:
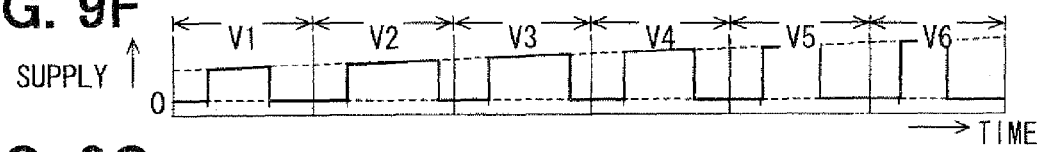
Figure 9G:
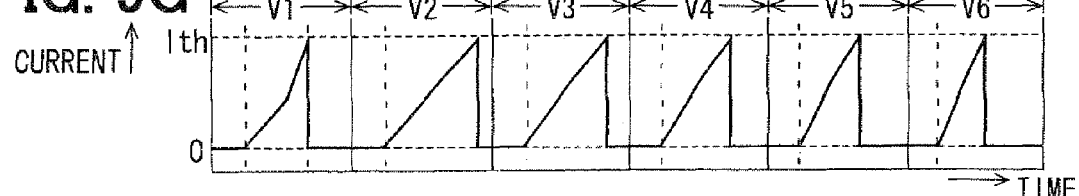
Figure 9H:
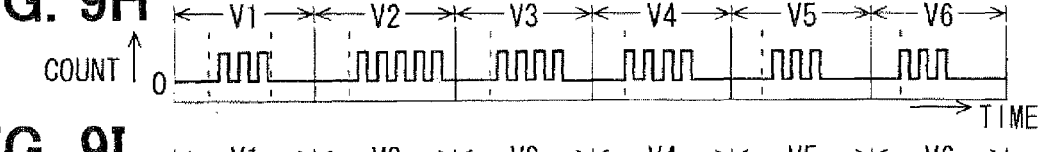
Figure 9I:
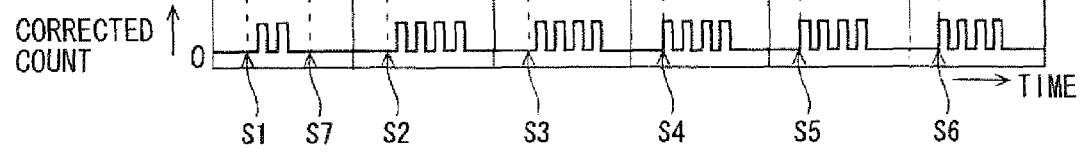

Referring to a set of FIGS. 5C to 8E, in this embodiment, meanwhile, voltage is supplied until a current threshold value Ith is reached as illustrated in FIG. 8D. Then the time from when voltage supply is started to when voltage supply is terminated is counted based on clock. When the three phase coils 11, 12, 13 are magnetically saturated, the inductance of the coils is rapidly reduced and as a result, the degree of increase in current is increased. In the example in FIG. 5D, for example, the degree of increase in current is increased at the point indicated by symbol (A). Therefore, it can be estimated that the north pole of the rotor 14 is positioned in the voltage supplying direction in which the count based on clock is minimized. In the case of behavior illustrated in FIGS. 8C to 8E, the number of clock pulses COUNT1 and COUNT2 are compared.

FIGS. 9A to 9D and FIGS. 9E to 9I are explanatory drawings illustrating voltage supplying directions, power source voltage, supplied voltage, wiring current, and count signal in correspondence with one another. It will be assumed that the rotor 14 is at a stop so that its north pole faces toward the voltage supplying direction V1. Here, the description will be given on the assumption that the power source voltage Vin increases with time and the supplied voltage also rises in conjunction therewith. A set of FIGS. 9A to 9D illustrates a comparative example in which counts are not corrected and a set of FIGS. 9E to 9I illustrates a case in this embodiment in which counts are corrected.

When voltage is supplied first at time s1 as illustrated in FIGS. 9A to 9D, the current of the three phase coils 11, 12, 13 steadily increases. When a current value reaches to the current threshold value Ith at time s2, the supply of voltage is terminated. In this example, a count is obtained by counting the count signal (for example, rising edges thereof) during this voltage supply period. Since voltage has been supplied only in one direction at this time, voltage is supplied in another direction at time s3. Thus voltage is supplied in all the voltage supplying directions V1 to V6. (Refer to FIG. 4A.) Thereafter, counts based on the individual voltage supply periods are compared.

In the example in FIGS. 9A to 9D, however, the power source voltage Vin steadily increases and the supplied voltage also rises in conjunction with the power source voltage Vin. For this reason, the wiring current becomes large. Therefore, the count is "3" in each of the voltage supplying directions V1, V5, and V6 and the rotor position cannot be accurately estimated.

Referring to the set of FIGS. 9E to 9I, in this embodiment, consequently, the following measure is taken: counting is started at the same time as voltage is supplied (S201 of the flow in FIG. 7); at this time, power source voltage is detected at time S1 (S200) prior to the supply of voltage. When voltage is supplied, the current of the three phase coils 11, 12, 13 steadily increases. When the current reaches the predetermined threshold value (S203: YES), counting is terminated at time S7 and at the same time, the supply of voltage is terminated (S205). At this time, the count is multiplied by the ratio of the reference voltage Vs to the power source voltage Vin (Vs/Vin) to correct the count (S206).

Voltage has been supplied only in one direction (voltage supplying direction V1) at this time (S207 of the flow in FIG. 7: NO). Therefore, voltage is supplied next at time S2 in the voltage supplying direction V2 (S201). Thus the processing is repeated so that voltage is supplied in all the voltage supplying directions V1 to V6. (Refer to FIG. 4A.)

Therefore, the corrected count Tx' is expressed as described Tx'=Tx·(Vs/Vinx), where the following assumption is made: the count in each direction is let to be Tx (x is an integer of 1 to 6; this is the same with the following); and the power source voltage detected at time S1, S2, S3, S4, S5, S6 in FIGS. 9E to 9I is let to be Vinx.

When voltage is supplied in the voltage supplying direction V6 and the number of times of voltage supply reaches "6" (S207: YES), a voltage supplying direction in which the corrected count is minimized is searched for (S208). In the embodiment in FIGS. 9E to 9I, the count in the first voltage supplying direction V1 is "2" and lowest. Therefore, it is estimated that the north pole of the rotor 14 is positioned in the voltage supplying direction V1 (strictly within a predetermined angular range with this direction at the center).

When the rotor position is estimated, the commutation voltage supplying direction is determined as mentioned above (S209 of the flow in FIG. 7) and voltage is supplied to start the motor 10 (S210). Specifically, magnetic flux for each commutation voltage supplying direction is produced by switching the FETs 71 to 76 to change the mode of voltage supply as illustrated in FIG. 6C.

The motor 10 in this embodiment constitutes "brushless motor"; the current detection unit 30 constitutes "current detecting means"; the voltage supply unit 20 constitutes "voltage supplying means"; the control unit 40 constitutes "voltage supply controlling means," "supply period acquiring means (counting means)," "period correcting means," "rotor position estimating means," and "motor start-up controlling means; and the voltage detection unit 80 constitutes "power source voltage detecting means." The processing of S201, S203, S204, S205, and S207 of the flow in FIG. 7 corresponds to the processing of "voltage supply controlling means"; the count processing carried out at S201 to S205 corresponds to the processing of "supply period acquiring means"; the processing of S206 corresponds to the processing of "period correcting means"; the processing of S208 corresponds to the processing of "rotor position estimating means"; and the processing of S209 and S210 corresponds to the processing of "motor start-up controlling means." The processing of S200 of the flow in FIG. 7 corresponds to "Procedural Step (1)"; the processing of S201 corresponds to "Procedural Step (2)"; the processing of S203 corresponds to "Procedural Step (3)"; the processing of S204 and S205 corresponds to "Procedural Step (4)"; the processing of S206 corresponds to "Procedural Step (5)"; the processing of S207 corresponds to "Procedural Step (6)"; the processing of S208 corresponds to "Procedural Step (7)"; and the processing of S209 and S210 corresponds to "Procedural Step (8)."

Description will be given to the effect produced by the start-up control system 1 for brushless motors in this embodiment.

In this embodiment, first, power source voltage is detected (S200 of the flow in FIG. 7) and voltage is supplied and counting is started (S201). A current response is detected (S202) and when a current threshold value is reached (S203: YES), counting is terminated and the supply of voltage is terminated (S205). The count is multiplied by the ratio of a reference voltage to the power source voltage detected at S200 to correct the count (S206). Then a voltage supplying direction in which the count is minimized is searched for (S208) and the stop position of the rotor 14 is estimated. According to this method, counts are corrected based on reference voltage; therefore, the rotor position can be accurately estimated even though power source voltage fluctuates. As a result, appropriate start-up of the motor 10 is achieved.

In this embodiment, voltage is continuously supplied until the current threshold value Ith is reached even though power source voltage drops. Therefore, it is possible to magnetically saturate the three phase coils 11, 12, 13 and avoid degradation in the accuracy of rotor position estimation. Even though power source voltage rises, the supply of voltage is terminated when the current threshold value Ith is reached. For this reason, it is unnecessary to make circuit elements and the like capable of withstanding large current and compact systems can be designed.

In this embodiment, power source voltage is detected (S200) prior to the supply of voltage (S201 of the flow in FIG. 7). Therefore, power source voltage can be appropriately detected without influence of voltage drop due to voltage supply.

In this embodiment, the following processing is carried out when the maximum voltage supply time has passed (S204: YES) after the supply of voltage is started (S201 of the flow in FIG. 7): counting is terminated and the supply of voltage is terminated (S205). This makes it possible to prevent the time required to supply voltage for magnetically saturating the three phase coils 11, 12, 13 from becoming too long, for example, when power source voltage significantly drops.

In the first and second embodiments, the invention is applied to a start-up control system for brushless motors for driving a vehicle fuel pump. The invention is not limited to this and can be applied to any motor driven apparatus having a brushless motor.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An apparatus for estimating rotor position for brushless motors which includes a brushless motor having a stator with coils wound thereon and a rotor rotatably supported relative to the stator and estimates the stop position of the rotor, the estimating apparatus comprising:

a current detecting means for directly or indirectly detecting wiring current which is current passed through the coils;

a voltage supplying means capable of supplying voltage to the coils so that magnetic flux is produced in each of a plurality of directions perpendicular to the direction of rotation of the rotor;

a power source voltage detecting means for detecting the voltage of a power source used for the voltage supply;

a voltage supply controlling means which controls the voltage supplying means so that magnetic flux is produced in sequence in predetermined directions among the directions and, when a predetermined voltage supply time has passed, terminates the supply of voltage by the voltage supplying means;

a current correcting means which corrects wiring current detected at the current detecting means based on power source voltage detected at the power source voltage detecting means and preset reference voltage in each direction in which magnetic flux is produced under control of the voltage supply controlling means; and a rotor position estimating means which compares wiring currents corrected by the current correcting means to identify a direction in which the peak amplitude value of wiring current is maximized and estimates the stop position of the rotor based on the identified direction.

2. The apparatus for estimating rotor position for brushless motors of claim 1, wherein the power source voltage detecting means detects the voltage of a power source prior to the supply of voltage in each of the predetermined directions.

3. The apparatus for estimating rotor position for brushless motors of claim 1, wherein the current correcting means corrects the peak amplitude value of the wiring current.

4. The apparatus for estimating rotor position for brushless motors of claim 1, wherein the rotor position estimating means considers a magnetic pole of the rotor to be positioned within a predetermined angular range in the direction of rotation of the rotor based on the direction in which the corrected peak amplitude value of wiring current is maximized and thereby estimates the stop position of the rotor.

5. A start-up control system for brushless motors which includes a brushless motor having a stator with coils wound thereon and a rotor rotatably supported relative to the stator and carries out start-up control on the brushless motor, the control system comprising:

a current detecting means for directly or indirectly detecting wiring current which is current passed through the coils;

a voltage supplying means capable of supplying voltage to the coils so that magnetic flux is produced in each of a plurality of directions perpendicular to the direction of rotation of the rotor;

a power source voltage detecting means for detecting the voltage of a power source used for the voltage supply;

a voltage supply controlling means which controls the voltage supplying means so that magnetic flux is produced in sequence in predetermined directions among the directions and, when a predetermined voltage supply time has passed, terminates the supply of voltage by the voltage supplying means;

a current correcting means which corrects wiring current detected at the current detecting means based on power source voltage detected at the power source voltage detecting means and preset reference voltage in each direction in which magnetic flux is produced under control of the voltage supply controlling means;

a rotor position estimating means which compares wiring currents corrected by the current correcting means to identify a direction in which the peak amplitude value of wiring current is maximized and estimates the stop position of the rotor based on the identified direction; and a motor start-up controlling means which determines a direction of magnetic flux for causing commutation in the rotor from among the directions based on the stop position of the rotor estimated at the rotor position estimating means, and controls the voltage supplying means so as to produce magnetic flux in that direction and starts the brushless motor.

6. The start-up control system for brushless motors of claim 5, wherein the power source voltage detecting means detects the voltage of a power source prior to the supply of voltage in each of the predetermined directions.

7. The start-up control system for brushless motors of claim 5, wherein the current correcting means corrects the peak amplitude value of the wiring current.

8. The start-up control system for brushless motors of claim 5, wherein the rotor position estimating means considers a magnetic pole of the rotor to be positioned within a predetermined angular range in the direction of rotation of the rotor based on the direction in which the peak amplitude value of wiring current corrected at the current correcting means is maximized and thereby estimates the stop position of the rotor.

9. A start-up control method for brushless motors which includes a brushless motor having a stator with coils wound thereon and a rotor rotatably supported relative to the stator and is used to carry out start-up control on the brushless motor, the control method comprising:

first step of detecting the voltage of a power source for supplying voltage to the coils;

second step of supplying voltage to the coils so that magnetic flux is produced in predetermined directions among a plurality of directions perpendicular to the direction of rotation of the rotor;

third step of detecting wiring current which is current passed through the coils;

fourth step of, when a voltage supply time has passed, terminating the supply of the voltage;

fifth step of correcting the wiring current based on power source voltage detected at the first step and predetermined reference voltage;

sixth step of repeating the steps including the first step to the fifth step in all the predetermined directions;

seventh step of comparing wiring currents corrected at the fifth step to identify a direction in which the peak amplitude value of wiring current is maximized from among the predetermined directions and estimating the stop position of the rotor based on the identified direction; and eighth step of determining a direction of magnetic flux for causing commutation in the rotor from among the directions based on the estimated stop position of the rotor, and controlling the voltage supplying means so as to produce magnetic flux in that direction and starting the brushless motor.

10. The start-up control method for brushless motors of claim 9, wherein at the fifth step, the peak amplitude value of wiring current is corrected.

11. The start-up control method for brushless motors of claim 9, wherein at the seventh step, a magnetic pole of the rotor is considered to be positioned within a predetermined angular range in the direction of rotation of the rotor based on the direction in which the corrected peak amplitude value of the wiring current is maximized and the stop position of the rotor is thereby estimated.

12. An apparatus for estimating rotor position for brushless motors which includes a brushless motor having a stator with coils wound thereon and a rotor rotatably supported relative to the stator and estimates the stop position of the rotor, the estimating apparatus comprising:
- a current detecting means for directly or indirectly detecting wiring current which is current passed through the coils;
- a voltage supplying means capable of supplying voltage to the coils so that magnetic flux is produced in each of a plurality of directions perpendicular to the direction of rotation of the rotor;
- a power source voltage detecting means for detecting the voltage of a power source used for the voltage supply in each of the predetermined directions;
- a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means;
- a supply period acquiring means which acquires a period equivalent value equivalent to a voltage supply period in each direction in which magnetic flux is produced under control of the voltage supply controlling means;
- a period value correcting means which corrects a period equivalent value acquired at the supply period acquiring means based on power source voltage detected at the power source voltage detecting means and predetermined reference voltage; and
- a rotor position estimating means which compares period equivalent values corrected by the period value correcting means to identify a direction in which the voltage supply period is minimized and estimates the stop position of the rotor based on the identified direction.

13. The apparatus for estimating rotor position for brushless motors of claim 12,
wherein the power source voltage detecting means detects the voltage of a power source prior to the supply of voltage in each of the predetermined directions.

14. The apparatus for estimating rotor position for brushless motors of claim 12,
wherein the supply period acquiring means is comprised of a counting means for doing count during the voltage supply period and a count by the counting means is acquired as the period equivalent value.

15. The apparatus for estimating rotor position for brushless motors of claim 14,
wherein the period value correcting means corrects counts by the counting means.

16. The apparatus for estimating rotor position for brushless motors of claim 12,
wherein the rotor position estimating means considers a magnetic pole of the rotor to be positioned within a predetermined angular range in the direction of rotation of the rotor based on the direction in which the corrected period equivalent value is minimized and thereby estimates the stop position of the rotor.

17. The apparatus for estimating rotor position for brushless motors of claim 12,
wherein, when the wiring current detected at the current detecting means does not exceed a predetermined threshold value and a predetermined time has passed, the voltage supply controlling means terminates the supply of voltage by the voltage supplying means.

18. The apparatus for estimating rotor position for brushless motors of claim 17,
wherein the predetermined time is so set that the wiring current reaches the predetermined threshold value in at least one direction among predetermined directions in which voltage is supplied.

19. A start-up control system for brushless motors which includes a brushless motor having a stator with coils wound thereon and a rotor rotatably supported relative to the stator and carries out start-up control on the brushless motor, the control system comprising:
- a current detecting means for directly or indirectly detecting wiring current which is current passed through the coils;
- a voltage supplying means capable of supplying voltage to the coils so that magnetic flux is produced in each of a plurality of directions perpendicular to the direction of rotation of the rotor;
- a power source voltage detecting means for detecting the voltage of a power source used for the voltage supply;
- a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means;
- a supply period acquiring means which acquires a period equivalent value equivalent to a voltage supply period in each direction in which magnetic flux is produced under control of the voltage supply controlling means;
- a period value correcting means which corrects a period equivalent value acquired at the supply period acquiring means based on power source voltage detected at the power source voltage detecting means and predetermined reference voltage;
- a rotor position estimating means which compares period equivalent values corrected by the period value correcting means to identify a direction in which the voltage supply period is minimized and estimates the stop position of the rotor based on the identified direction; and
- a motor start-up controlling means which determines a direction of magnetic flux for causing commutation in the rotor from among the directions based on the stop position of the rotor estimated at the rotor position estimating means, and controls the voltage supplying means so as to produce magnetic flux in that direction and starts the brushless motor.

20. The start-up control system for brushless motors of claim 19,
wherein the power source voltage detecting means detects the voltage of a power source prior to the supply of voltage in each of the predetermined directions.

21. The start-up control system for brushless motors of claim 19,
wherein the supply period acquiring means is comprised of a counting means for doing count during the voltage supply period and acquires a count by the counting means as the period equivalent value.

22. The start-up control system for brushless motors of claim 21,
wherein the period value correcting means corrects counts by the counting means.

23. The start-up control system for brushless motors of claim 19,
wherein the rotor position estimating means considers a magnetic pole of the rotor to be positioned within a predetermined angular range in the direction of rotation of the rotor based on the direction in which the corrected period equivalent value is minimized and thereby estimates the stop position of the rotor.

24. The start-up control system for brushless motors of claim 19,
wherein, when the wiring current detected at the current detecting means does not exceeds a predetermined threshold value and a predetermined time has passed, the voltage supply controlling means terminates the supply of voltage by the voltage supplying means.

25. The start-up control system for brushless motors of claim 24,
wherein the predetermined time is so set that the wiring current reaches the predetermined threshold value in at least one direction among predetermined directions in which voltage is supplied.

26. A start-up control method for brushless motors which includes a brushless motor having a stator with coils wound thereon and a rotor rotatably supported relative to the stator and is used to carry out start-up control on the brushless motor, the control method comprising:
first step of detecting the voltage of a power source for supplying voltage to the coils;
second step of supplying voltage to the coils so that magnetic flux is produced in predetermined directions among a plurality of directions perpendicular to the direction of rotation of the rotor and starting counting at the same time;
third step of determining that wiring current which is current passed through the coils has exceeded a predetermined threshold value;
fourth step of, when the wiring current is determined to have exceeded the predetermined threshold value, terminating the supply of the voltage and terminating counting;
fifth step of correcting a count corresponding to the voltage supply period based on power source voltage detected at the first step and predetermined reference voltage;
sixth step of repeating the steps including the first step to the fifth step in all the predetermined directions;
seventh step of comparing counts corrected at the fifth step to identify a direction in which the count is minimized from among the predetermined directions and estimating the stop position of a rotor based on the identified direction; and
eighth step of determining a direction of magnetic flux for causing commutation in the rotor from among the directions based on the estimated stop position of the rotor, and controlling the voltage supplying means so as to produce magnetic flux in that direction and starting the brushless motor.

27. The start-up control method for brushless motors of claim 26,
wherein at the seventh step, a magnetic pole of the rotor is considered to be positioned within a predetermined angular range in the direction of rotation of the rotor based on the direction in which the count is minimized and the stop position of the rotor is thereby estimated.

28. The start-up control method for brushless motors of claim 26,
wherein at the fourth step, the supply of the voltage is terminated when the wiring current does not exceed a predetermined threshold value and a predetermined time has passed.

29. The start-up control method for brushless motors of claim 28,
wherein the predetermined time is so set that the wiring current reaches the predetermined threshold value in at least one direction among predetermined directions in which voltage is supplied.

* * * * *